United States Patent
Wu et al.

(10) Patent No.: US 10,813,264 B2
(45) Date of Patent: Oct. 27, 2020

(54) DEPTH CONTROL FOR GROUND ENGAGING TOOLS OF AN IMPLEMENT

(71) Applicant: CNH Industrial America LLC, New Holland, PA (US)

(72) Inventors: Duqiang Wu, Bolingbrook, IL (US); William Allen, Peoria, IL (US); Navneet Gulati, Naperville, IL (US); Michael Glennon, Normal, IL (US)

(73) Assignee: CNH Industrial America LLC, New Holland, PA (US)

( * ) Notice: Subject to any disclaimer, the term of this patent is extended or adjusted under 35 U.S.C. 154(b) by 119 days.

(21) Appl. No.: 16/100,724

(22) Filed: Aug. 10, 2018

(65) Prior Publication Data

US 2020/0045868 A1 Feb. 13, 2020

(51) Int. Cl.
*A01B 63/111* (2006.01)
*F15B 15/28* (2006.01)
*A01B 63/102* (2006.01)
*A01B 63/00* (2006.01)

(52) U.S. Cl.
CPC .......... *A01B 63/111* (2013.01); *A01B 63/008* (2013.01); *A01B 63/102* (2013.01); *F15B 15/2861* (2013.01)

(58) Field of Classification Search
CPC ... A01B 63/111; A01B 63/008; A01B 63/102; A01B 63/32; A01B 49/027; F15B 15/2861
See application file for complete search history.

(56) References Cited

U.S. PATENT DOCUMENTS

| | | | |
|---|---|---|---|
| 4,821,806 A | 4/1989 | Winter | |
| 8,544,397 B2 | 10/2013 | Bassett | |
| 8,634,992 B2 | 1/2014 | Sauder et al. | |
| 8,857,530 B2 | 10/2014 | Henry | |
| 8,910,582 B2 | 12/2014 | Mariman et al. | |
| 9,232,687 B2* | 1/2016 | Bassett | A01B 49/06 |
| 9,288,937 B2 | 3/2016 | Sauder et al. | |
| 9,532,496 B2 | 1/2017 | Sauder et al. | |
| 9,554,504 B2 | 1/2017 | Houck | |
| 9,609,799 B2* | 4/2017 | Henry | A01B 21/083 |
| 9,615,499 B2 | 4/2017 | Kowalchuk et al. | |
| 9,681,601 B2 | 6/2017 | Bassett | |
| 9,723,776 B2* | 8/2017 | Sporrer | A01B 63/32 |

(Continued)

*Primary Examiner* — Jessica H Lutz
(74) *Attorney, Agent, or Firm* — Rebecca L. Henkel; Rickard K. DeMille (57) ABSTRACT

The present inventors have recognized that hydraulic cylinders for raising and lowering ground engaging tools of an implement can be synchronously controlled with respect to a prioritized primary set of tools, such as a section of tillage shanks for ripping compacted soil, which cylinder adjustment affects all other sections due to the arrangement of the primary set on the frame. A user can electronically command new ground engaging depths for the primary set and/or any secondary set of ground engaging tools. If the primary set is updated, the system can synchronously control the primary set and the other sections to adjust respective cylinders to achieve desired depths. However, if only a second set is updated, and not the primary set, the system can control only the second set to adjust its cylinder to the desired depth without affecting the primary set or any other second set.

15 Claims, 6 Drawing Sheets

(56) References Cited

U.S. PATENT DOCUMENTS

| | | |
|---|---|---|
| 9,961,823 B2 | 5/2018 | Sporrer et al. |
| 10,440,876 B2 * | 10/2019 | Sporrer .................. A01B 5/04 |
| 2014/0214284 A1 * | 7/2014 | Sauder .................. A01C 5/06 701/50 |
| 2015/0053442 A1 | 2/2015 | Kovach et al. |
| 2016/0205862 A1 | 7/2016 | Sudbrink et al. |
| 2017/0172050 A1 | 6/2017 | Henry |

* cited by examiner

DEPTH CONTROL FOR GROUND ENGAGING TOOLS OF AN IMPLEMENT

FIELD OF THE INVENTION

The present invention relates generally to agricultural systems having ground engaging tools, and more particularly, to systems in which a change for a ground engaging depth for a primary set causes changes in hydraulic cylinder lengths for the primary set and a secondary set whereas a change for a ground engaging depth for the secondary set causes a change in hydraulic cylinder length for only the secondary set.

BACKGROUND OF THE INVENTION

Farmers utilize a wide variety of tillage implements to prepare soil for planting. Some such implements include two or more sections (or sets of tools) coupled together to perform multiple functions as they are pulled through the fields by a tractor, for example, a cultivator/harrow which is capable of simultaneously tilling and leveling the soil in preparation for planting. This implement includes a cultivator that is towed by a tractor in a harrow that is towed by the cultivator.

It is often desirable to configure the sections (or sets) of the implement to engage the ground at different depths and at different times. For example, with an implement having a first section of disc blades for cutting agricultural residue, a second section of tillage shanks for ripping compacted soil, a third section of leveling discs for distributing soil, and/or a fourth section of baskets for breaking soil clods, such as the Ecolo-Tiger 875 disk ripper available from CNH Industrial, it is oftentimes desirable to set ground engaging depths for the respective sections to different depths. Moreover, it is oftentimes desirable to change ground engaging depths for particular sections and particular times. However, changing a ground engaging depth of one section may inadvertently result in a changed ground engaging depth of a different section. It is therefore desirable to provide a system for controlling depth of ground engaging tools of an implement that is easier to configure and use in the field.

SUMMARY OF THE INVENTION

The present inventors have recognized that hydraulic cylinders for raising and lowering ground engaging tools of an implement can be synchronously controlled with respect to a prioritized primary set of tools, such as a section of tillage shanks for ripping compacted soil, which cylinder adjustment affects all other sections due to the arrangement of the primary set on the frame. A user can electronically command new ground engaging depths for the primary set and/or any secondary set of ground engaging tools. If the primary set is updated, the system can synchronously control the primary set and the other sections to adjust respective cylinders to achieve desired depths. However, if only a second set is updated, and not the primary set, the system can control only the second set to adjust its cylinder to the desired depth without affecting the primary set or any other second set.

In one aspect, operation of an implement, such as an Ecolo-Tiger 875 disk ripper, can require independent adjustment of a main depth ("D1," also noted as "MD," via an MD cylinder, also noted as "C1"), a front disk frame depth ("D2," also noted as "DF," via a DF cylinder, also noted as "C2"), a main frame tilted angle or Fore-Aft ("D4," also noted as "FA," via an FA cylinder, also noted as "C4"), and a rear leveler near ground ("D3," also noted as "Lr," via an Lr cylinder, also noted as "C3") with respect to ground. However, the implement's design is such that DF, Lr and FA move along a shank depth adjustment if DF, Lr, and/or FA cylinders are locked. This is because their cylinders are attached on main frame. Thus, with DF, Lr, and/or FA being set and maintained, whenever MD is adjusted, DF, Lr, and/or FA are to be adjusted in an opposite direction. This corresponding adjustment is "coordinated control." Ideally, such coordinated control is "synchronous." A parallel control strategy is based on depth adjustment target; a new DF, Lr, and/or FA target are calculated with the condition of keeping their settings the same. Then, 4 functions' cylinder is independently driven to their targets. With parallel control, there is no interaction among and no significant initial delay; however, during movement, there can be some control error due to load differences, hydraulic gain differences and/or potentially, flow sequent supply. With series control, there is a master/slave control mode, i.e. DF, Lr, and/or FA take the corresponding transformation of MD's instantaneous position as their new instantaneous Target. However, DF, Lr, and/or FA could have some lag error or accumulated error due to delay of the hydraulic and control system, and/or a slower response when compared to an electric control system. The present invention provides a parallel plus series synchronous control method.

Specifically then, one aspect of the present invention can provide an agricultural implement, including: a frame supported by multiple wheels; multiple ground engaging tools supported by the frame, the ground engaging tools including a primary set and at least one secondary set, in which each set includes a hydraulic cylinder arranged with respect to the frame for raising and lowering the set, and in which each set is configured to engage the ground at a ground engaging depth when lowered to be in contact with the ground; a hydraulic system comprising a pump configured to supply hydraulic fluid and multiple electronically controlled valves, in which each electronically controlled valve is configured to meter hydraulic fluid with respect to a hydraulic cylinder; operator controls for configuring a ground engaging depth for each set; and a controller in communication with the hydraulic system and the operator controls, the controller executing a program stored in a non-transient medium to: upon receiving from the operator controls a change for a ground engaging depth for the primary set, calculate a cylinder length target for a hydraulic cylinder of the primary set and for each secondary set for achieving the ground engaging depth for each set, and control the hydraulic system to adjust the hydraulic cylinder of each set to the cylinder length target calculated for the set; and upon receiving from the operator controls a change for a ground engaging depth for a secondary set, calculate a cylinder length target for a hydraulic cylinder of only the secondary set for achieving the ground engaging depth for the set, and control the hydraulic system to adjust the hydraulic cylinder of only the secondary set to the cylinder length target calculated for the set.

Another aspect of the present invention can provide a method for changing ground engaging depths for tools of an agricultural implement, the agricultural implement including a frame supported by multiple wheels, multiple ground engaging tools supported by the frame, the ground engaging tools including a primary set and at least one secondary set, in which each set includes a hydraulic cylinder arranged with respect to the frame for raising and lowering the set, and in which each set is configured to engage the ground at a ground engaging depth when lowered to be in contact with the ground, and a hydraulic system including a pump configured to supply hydraulic fluid and multiple electronically controlled valves, in which each electronically controlled valve is configured to meter hydraulic fluid with respect to a hydraulic cylinder, the method including: configuring a ground engaging depth for each set; upon receiving a change for a ground engaging depth for the primary set, calculating a cylinder length target for a hydraulic cylinder of the primary set and for each secondary set for achieving the ground engaging depth for each set, and controlling the hydraulic system to adjust the hydraulic cylinder of each set to the cylinder length target calculated for the set; and upon receiving a change for a ground engaging depth for a secondary set, calculating a cylinder length target for a hydraulic cylinder of only the secondary set for achieving the ground engaging depth for the set, and controlling the hydraulic system to adjust the hydraulic cylinder of only the secondary set to the cylinder length target calculated for the set.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION

Figure 1:
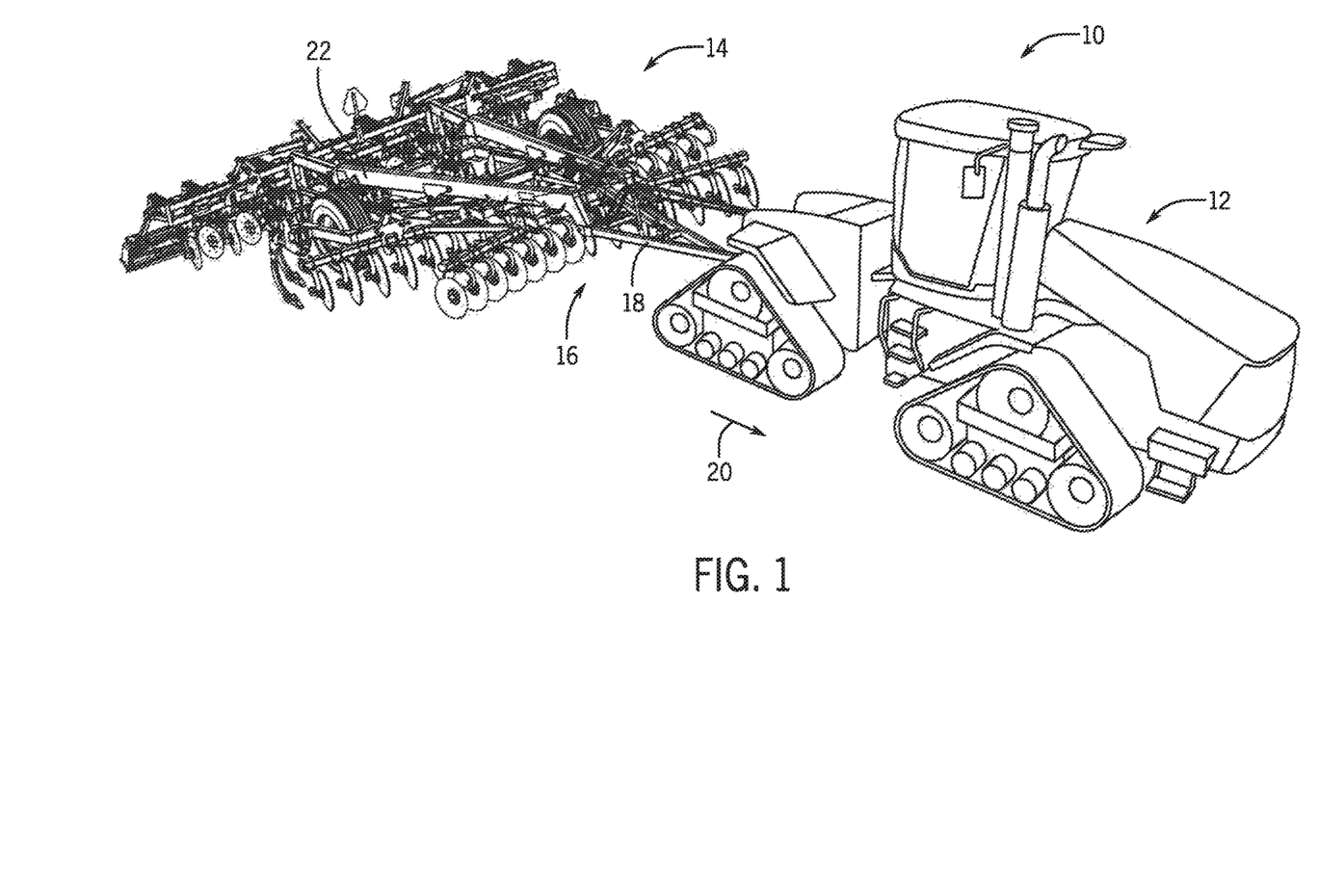
FIG. 1 is perspective view of an exemplar agricultural implement, being pulled by a tractor, which can include multiple ground engaging tools controlled in accordance with an aspect of the invention.
Figure 2:
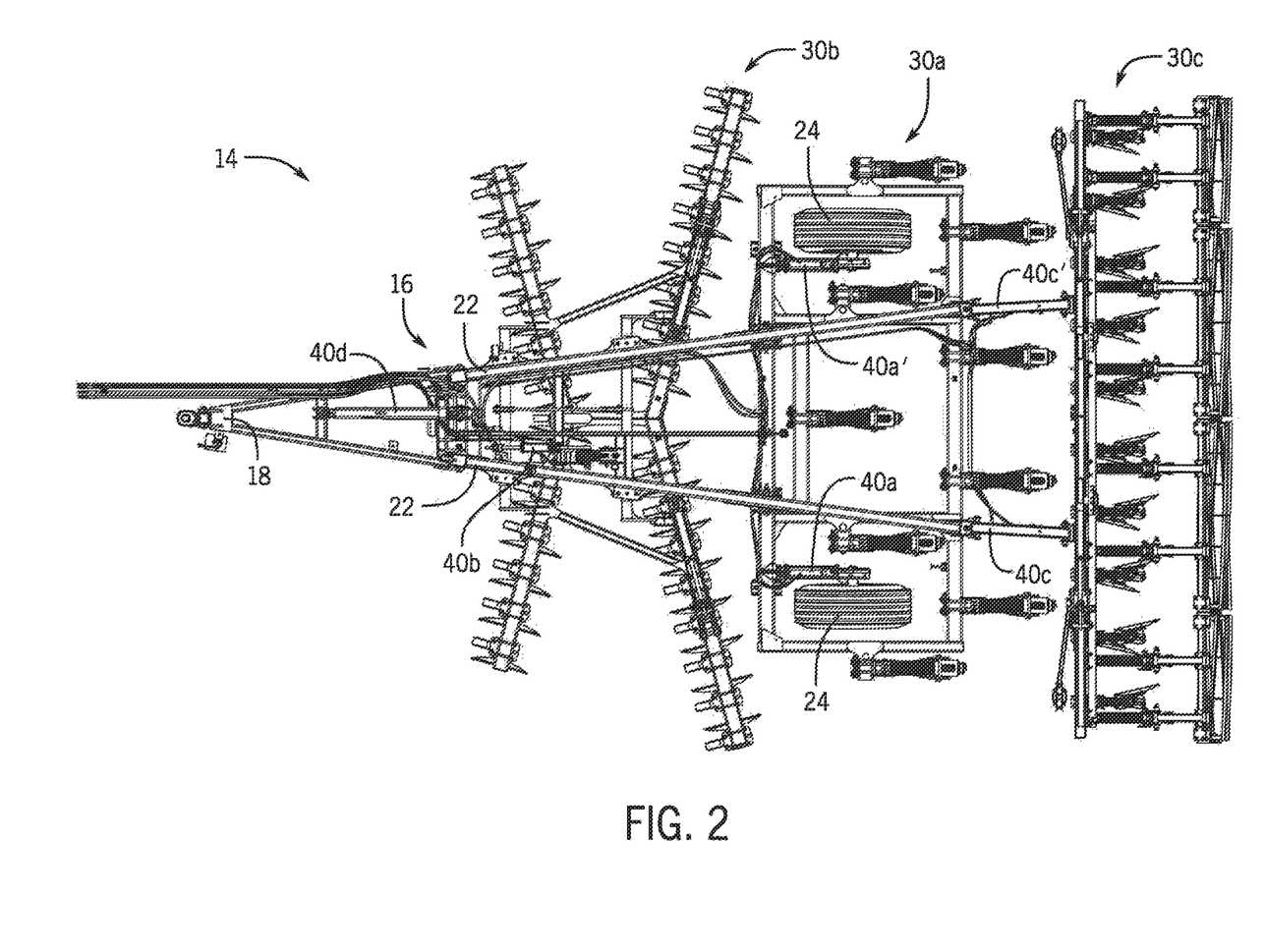
FIG. 2 is a top view of the implement of FIG. 1, illustrating hydraulic cylinders for raising and lowering ground engaging tools, controlled in accordance with an aspect of the invention.
Figure 3:
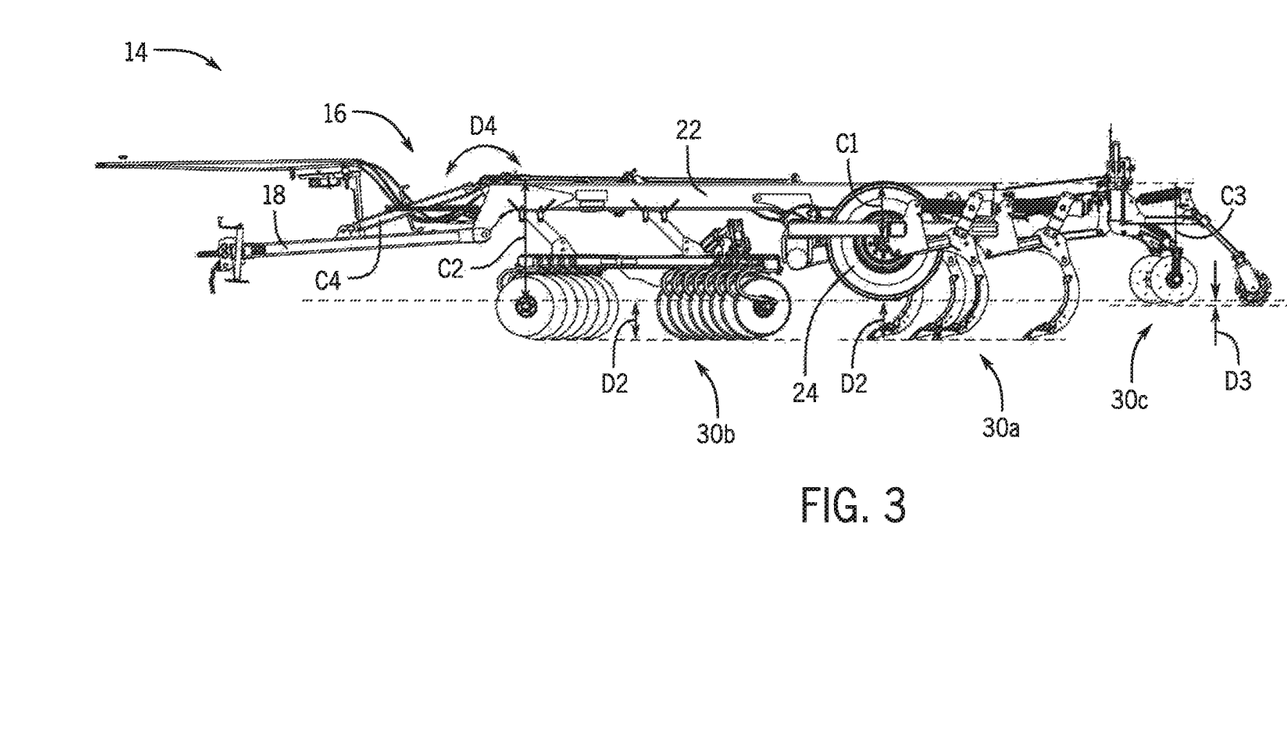
FIG. 3 is a side view of the implement of FIG. 2, illustrating ground engaging depths for the ground engaging tools.

Referring now to the drawings, and more particularly to FIG. 1, there is shown by way of example an agricultural system 10 which generally includes a tractor 12 and an agricultural implement 14 for tilling and finishing soil prior to seeding. With additional reference to FIGS. 2 and 3 showing top and sides views, respectively, the implement 14 can be configured as a multi-section (combination tool) field disk ripper, such as the Ecolo-Tiger 875 disk ripper, as available from CNH Industrial. The implement 14 can include a carriage frame 16 which can directly towed by a traction unit, such the tractor 12. The frame 16 can include a pull hitch 18 generally extending in a travel direction 20, and forward and aft directed carrier frame members 22 which are coupled with and extend from pull hitch 18. Reinforcing gusset plates may be used to strengthen the connection between pull hitch 18 and carrier frame members 22.

The frame 16 can be supported by multiple wheels 24. The wheels 24 can be pivoted between a field operation position and a transport position by actuator assemblies associated with the wheels. The frame 16, in turn, can support multiple ground engaging tools 30 that are useful for field operations, including a primary set of ground engaging tools 30a and one or more secondary sets of ground engaging tools, such as secondary sets 30b and 30c. In one aspect, the primary set of ground engaging tools 30a could comprise tillage shanks for ripping compacted soil. A secondary set of ground engaging tools 30b could comprise disc blades for cutting agricultural residue, such as corn stalks, that are arranged forward of the tillage shanks. Another secondary set of ground engaging tools 30c could comprise leveling discs for distributing soil, and/or baskets (or "crumblers") for breaking large soil clods, which are arranged rearward of the leveling discs.

Each set of ground engaging tools includes one or more hydraulic cylinders 40 arranged with respect to the frame 16. The hydraulic cylinders 40 are configured to raise and lower each respective set of ground engaging tools 30 with respect to the frame 16. Accordingly, each set of ground engaging tools 30 can be configured to engage the ground at a ground engaging depth ("D"), when lowered by respective hydraulic cylinders 40, to be in contact with the ground. For example, the primary set of ground engaging tools 30a can include one or more cylinders 40a (such as cylinder 40a identified as "C1 LH" and cylinder 40a' identified as "C1 RH" on left and right sides, respectively, mechanically linked through a rockshaft, but hydraulically plumbed in parallel) identified as "C1" for raising and lowering the tillage shanks for engaging the ground at a tillage ground engaging depth "D1;" the secondary set of ground engaging tools 30b can include one or more cylinders 40b (identified as "C2") for raising and lowering the disc blades for engaging the ground at a disc blade ground engaging depth "D2;" and the secondary set of ground engaging tools 30c can include one or more cylinders 40c (such as cylinder 40c identified as "C3 LH" and cylinder 40c' identified as "C3 RH" on left and right sides, respectively, which are not mechanically linked through a rockshaft, but are hydraulically plumbed in parallel) identified as "C3" for raising and lowering the leveling discs and/or baskets for engaging the ground at a leveling ground engaging depth "D3." In addition, a hydraulic cylinder 40d (identified as "C4") can be arranged with respect to the frame 16 for changing an angle of the frame 16 (identified as "D4") with respect to the ground, preferably for leveling the frame 16 with respect to the hitch 18 and the tractor 12.

In operation, retracting C1 lowers the frame 16 (and the primary set 30a), whereas extending C1 raises the frame 16; extending C2 raises the disc blades (the secondary set 30b), whereas retracting C2 lowers the disc blades; extending C3 raises the leveling discs and/or baskets (the secondary set 30c), whereas retracting C3 lowers the leveling discs and/or baskets; and extending C4 pitches the implement 14 forward (angle of the frame 16), whereas retracting C4 pitches the implement 14 rearward.

A maximum ground engaging depth D1 for the primary set 30a can typically be greater than a maximum ground engaging depth for any secondary set, such as 30b and/or 30c. For example, the maximum ground engaging depth for the primary set 30a comprising tillage shanks could be at least 14 inches. However, during a work or field mode, the maximum ground engaging depth for the secondary sets 30b or 30c, comprising disc blades and/or leveling discs, could be 3 to 4 inches.

Figure 4:
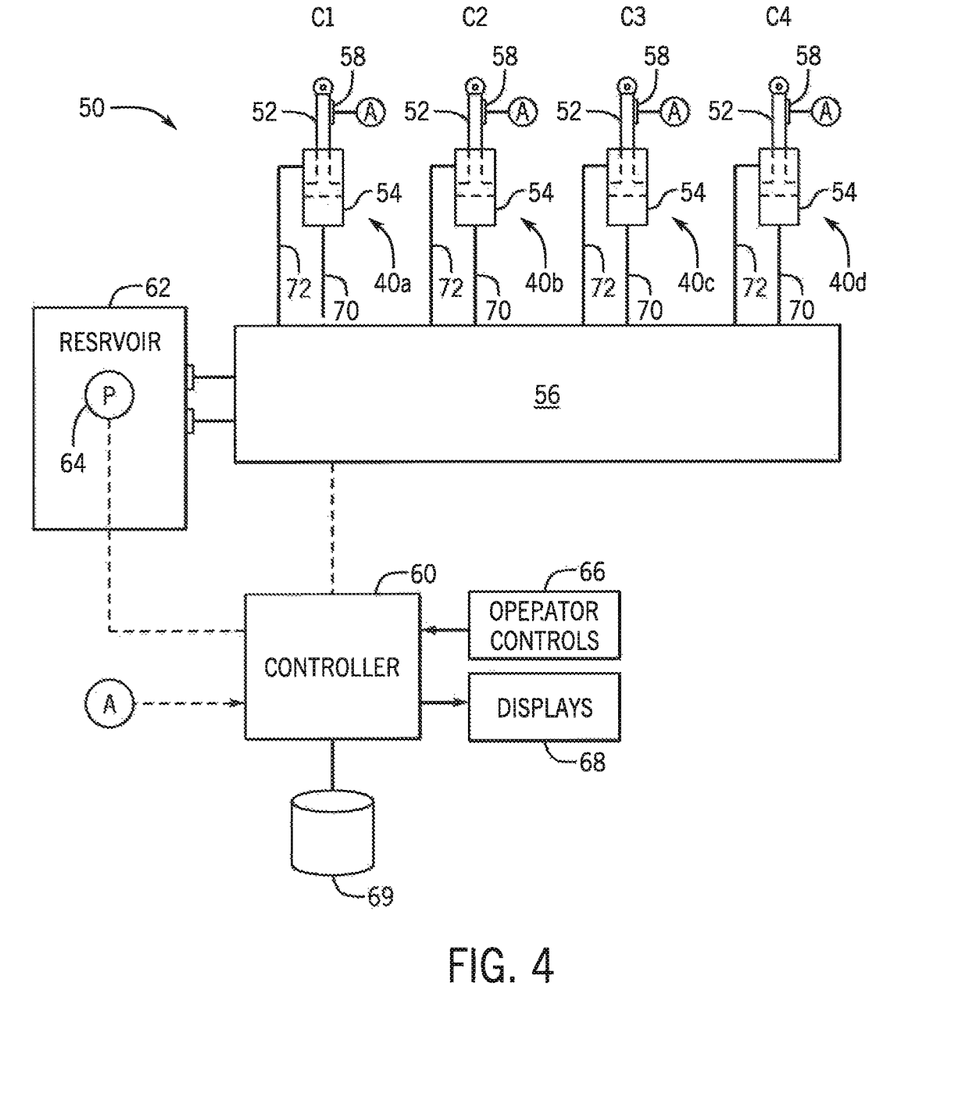
FIG. 4 is a schematic diagram for controlling ground engaging depths of FIG. 3 in accordance with aspect of the invention.

With additional reference to FIG. 4, a schematic diagram for a ground engaging depth control system 50, located on the implement 14 or tractor 12, for synchronously controlling ground engaging depths D1, D2, D3 and D4 (angle), by way of cylinders C1, C2, C3 and C4, is provided in accordance with aspect of the invention. Each cylinder 40 includes a movable "piston" or rod 52 that is extendable and retractable from a "cap" or base 54 of the cylinder 40, as fluidly controlled by a hydraulic system including an electronically controlled valve system 56, a fluid reservoir 62 and a pump 64. Each cylinder 40 can be a double acting, single ended hydraulic cylinder with an integrated linear position sensor, such as those described in U.S. Pat. Nos. 7,307,418, 7,259,553, and 7,034,527, the disclosures of which are incorporated herein by reference. In particular, a sensor 58, such as a linear potentiometer, integrated with respect to the cylinders 40, can provide a signal to a controller 60 indicating a linear displacement of the respective cylinder 40, reflected by an amount of extension or retraction of the rod 52. The controller 60 can selectively energize one or more electronically controlled valves, via solenoids, of the valve system 56 operably connected to the cylinder 40. Valves of the valve system 56 can meter-in and meter-out hydraulic fluid with respect to cylinders 40 for precise control of cylinder lengths. The solenoids are fluidly connected to the fluid reservoir 62 that includes the pump 64 configured to supply hydraulic fluid from the fluid reservoir 62. The pump 64 could supply hydraulic fluid at a pressure, for example, of at least 3000 psi (pounds per square inch). To extend the rod 52 of any particular cylinder 40, hydraulic fluid can be supplied to the cylinder 40 through a base port 70, while hydraulic fluid is also withdrawn from the cylinder 40 through a rod port 72, as controlled by the valve system 56 and the controller 60. Also, to retract the rod 52 of any particular cylinder 40, hydraulic fluid can be supplied to the cylinder 40 through the rod port 72, while hydraulic fluid is also withdrawn from the cylinder 40 through the base port 70, as controlled by the valve system 56 and the controller 60.

The controller 60 can selectively energize solenoids of the valve system 56 to vary any of the cylinder lengths C1, C2, C3 and/or C4 to achieve ground engaging depths D1, D2, D3 and/or D4 (angle) as desired. Operator controls 66, which could be within an operator cab of the tractor 12, can receive inputs from an operator for configuring ground engaging depths D1, D2, D3 and/or D4 (angle) as desired. Various displays 68, which could also be within the operator cab, can provide feedback to the operator, including progress toward achievement of the desired ground engaging depths D1, D2, D3 and/or D4 (angle).

In accordance with an aspect of the invention, cylinders 40 can be synchronously controlled with respect to the primary set of ground engaging tools 30a, also being a prioritized set of tools. This is due to cylinder adjustment of the primary set of ground engaging tools 30a affecting relative depths of all other sets of ground engaging tools 30, i.e., secondary sets of ground engaging tools 30b and 30c, and angle of the frame 16, due to their arrangement on the frame 16. A user can electronically command new ground engaging depths for the primary set of ground engaging tools 30a and/or any secondary sets of ground engaging tools 30b and/or 30c and/or angle of the frame 16. If ground engaging depth D1 of the primary set 30a is updated, the system can synchronously control respective cylinders C1, C2, C3 and/or C4, to achieve desired depths and angle, including D1, D2, D3 and/or D4 (angle), calculated based on the physical geometry of the implement 14. However, if only a secondary set 30b and/or 30c is updated, or the angle of the frame 16 is updated, and not the primary set 30a, the system can control only the secondary set 30b and/or 30c and or angle of the frame 16 to adjust its cylinder C2, C3 or C4 to the desired depth or angle without affecting the primary set or any other second set. In particular, the controller 60 executing a program stored in a non-transient medium 69 to, upon receiving from the operator controls 66 a change for a ground engaging depth D for the primary set 30a, calculate a cylinder length target for a hydraulic cylinder 40 of the primary set 30a and for each secondary set 30b and 30c and angle of the frame 16 for achieving the ground engaging depth for each set and the angle, and control the hydraulic system to adjust the hydraulic cylinder 40 of each to the cylinder length target calculated. The controller 60 can further execute to, upon receiving from the operator controls 66 a change for a ground engaging depth D2 or D3 for secondary set 30b and/or 30c, or angle D4 for the angle of the frame 16, calculate a cylinder length target for a hydraulic cylinder 40 of only the secondary set 30b and/or 30c or angle of the frame 16 for achieving the ground engaging depth or angle, and control the hydraulic system to adjust the hydraulic cylinder 40 of only the secondary set 30b and/or 30c or angle of the frame 16 to the cylinder length target calculated.

Figure 5:
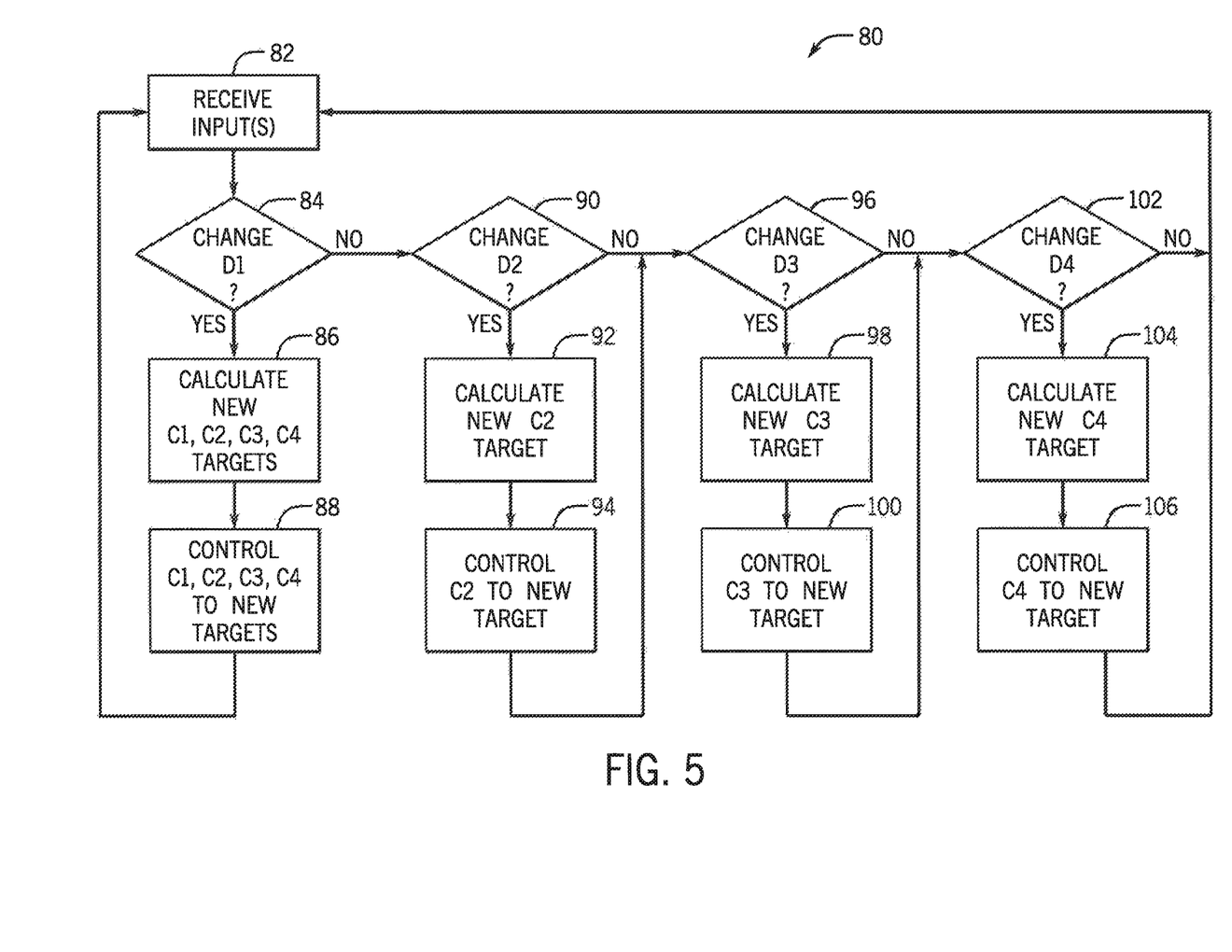
FIG. 5 is a flow diagram for controlling ground engaging depths of FIG. 3 in accordance with aspect of the invention.

With additional reference to FIG. 5 is a flow diagram 80 for controlling ground engaging depths is provided in accordance with aspect of the invention. Beginning at step 82, the system can receive inputs from an operator via the operator controls 66. Next, at decision step 84, the system can determine whether D1, a prioritized ground engaging depth, has been updated. If D1 has been updated ("Yes"), the system can proceed to step 86 to calculate cylinder length targets for C1, C2, C3 and/or C4 for achieving the ground engaging depth and angle presently configured. Then, at step 88, the system can control the hydraulic system to adjust the aforementioned cylinders 40 to the cylinder length targets calculated for each. Preferably, the system can execute a closed loop control system, with the feedback from sensors 58, to adjust each cylinder to a cylinder length within a tolerance band of the cylinder length targets. The process can then return to step 82 for further inputs.

Figure 6:
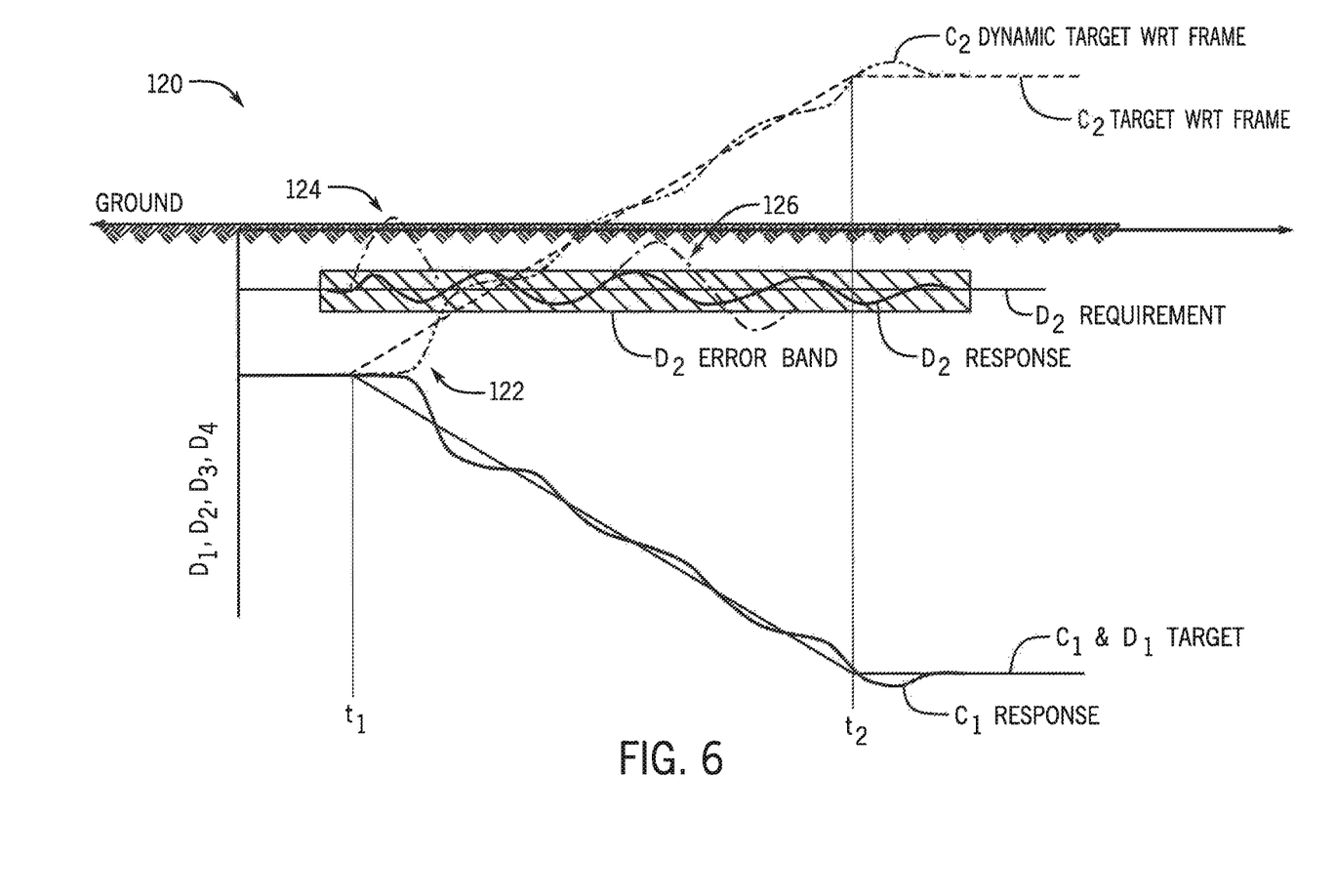
FIG. 6 is a timing diagram for controlling ground engaging depths of FIG. 3 with minimization of dynamic error in accordance with aspect of the invention.

With additional reference to FIG. 6, a timing diagram illustrates one aspect in which the aforementioned steps 86 and 88 can be accomplished with a minimization of dynamic error. At the outset, it should be noted that ground engaging depths and/or angles "D" (such as D1, D2, D3, D4) correspond to earth or ground coordinates, whereas cylinder lengths "C" (such as C1, C2, C3, C4) correspond to control of cylinders with respect to frame coordinates (such as the frame 16) as secondary sets. At the moment $t_1$, an operator can set a command with respect to mainframe depth, such as lowering the primary set of ground engaging tools 30a. The controller 60 can execute to determine the D1 target according to ground coordinates and the C2 target according to frame coordinates. Then, the cylinders 40 can be controlled to gradually ramp from their current positions to the new targets at $t_2$. The C1 cylinder can begin response to the C1 target profile. However, some control error can occur due to a delay 122 which could be due to, for example, ground conditions, hydraulic system interactions, and the like.

During the dynamic control process of C1, the controller 60 can also execute to instantaneously determine the C2 dynamic target with respect to the frame. The C2 cylinder is controlled not only according to the C2 target, which was determined at $t_1$, but also at the same time according to the C2 dynamic target. This combined control method can achieve a satisfied control error, limiting a control error of D2 to within a defined D2 error band. The large control error 124 can be avoided due to the significant delay 122 of the mainframe control system with C1, so long as control of C2 is based on the C2 target determined at $t_1$. Also, the large fluctuation 126 can be limited due to delay in the control of C2, so long as the control of C2 is based on the C2 dynamic target. C3 (and D3) and C4 (and D4) can be similarly controlled like C2 (and D2).

Referring again to FIG. 5, if at decision step 84 the system determines that D1, the prioritized ground engaging depth, has not been updated ("No"), the system can instead proceed to decision step 90. At decision step 90, the system can determine whether D2, a secondary set, has been updated. If D2 has been updated ("Yes"), the system can proceed to step 92 to calculate a cylinder length target for only C2 for achieving the ground engaging depth D2. Then, at step 94, the system can control the hydraulic system to adjust the only aforementioned cylinder C2 to the cylinder length target that was calculated. Preferably, the system can execute a closed loop control system, with the feedback from sensor 58 for C2, to adjust C2 to a cylinder length within a tolerance band of the cylinder length target. The process can then continue to decision step 96. However, if at decision step 90 the system determines that D2, a non-prioritized ground engaging depth, has not been updated ("No"), the system can instead continue directly to decision step 96.

Similarly, at decision step 96, the system can determine whether D3, another secondary set, has been updated. If D3 has been updated ("Yes"), the system can proceed to step 98 to calculate a cylinder length target for only C3 for achieving the ground engaging depth D3. Then, at step 100, the system can control the hydraulic system to adjust only the aforementioned cylinder C3 to the cylinder length target that was calculated. Preferably, the system can execute a closed loop control system, with the feedback from sensor 58 for C3, to adjust C3 to a cylinder length within a tolerance band of the cylinder length target. The process can then continue to decision step 96. The process can then continue to decision step 102. However, if at decision step 96 the system determines that D3, a non-prioritized ground engaging depth, has not been updated ("No"), the system can instead continue directly to decision step 102.

Similarly, at decision step 102, the system can determine whether D4, the angle of the frame 16, has been updated. If D4 has been updated ("Yes"), the system can proceed to step 104 to calculate a cylinder length target for only C4 for achieving the ground angle D4. Then, at step 106, the system can control the hydraulic system to adjust only the aforementioned cylinder C4 to the cylinder length target that was calculated. Preferably, the system can execute a closed loop control system, with the feedback from sensor 58 for C4, to adjust C4 to a cylinder length within a tolerance band of the cylinder length target. The process can then continue to decision step 96. The process can then return to step 82 for further inputs. However, if at decision step 102 the system determines that D4, a non-prioritized angle, has not been updated ("No"), the system can instead continue directly to step 82.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. An agricultural implement, comprising:
   a frame supported by a plurality of wheels;
   a plurality of ground engaging tools supported by the frame, the plurality of ground engaging tools including a primary set and at least one secondary set, wherein each set includes a hydraulic cylinder arranged with respect to the frame for raising and lowering the set, and wherein each set is configured to engage the ground at a ground engaging depth when lowered to be in contact with the ground;
   a hydraulic system comprising a pump configured to supply hydraulic fluid and a plurality of electronically controlled valves, wherein each electronically controlled valve is configured to meter hydraulic fluid with respect to a hydraulic cylinder;
   operator controls for configuring a ground engaging depth for each set; and
   a controller in communication with the hydraulic system and the operator controls, the controller configured to execute a program stored in a non-transient medium to:
   upon receiving from the operator controls a change for a ground engaging depth for the primary set, calculate a cylinder length target for a hydraulic cylinder of the primary set and for each secondary set for achieving the ground engaging depth for each set, and control the hydraulic system to adjust the hydraulic cylinder of the primary set and each secondary set to the cylinder length target calculated for the primary set and for each secondary set, respectively; and
   upon receiving from the operator controls a change for a ground engaging depth for a secondary set, calculate a cylinder length target for a hydraulic cylinder of only the secondary set for achieving the ground engaging depth for the set, and control the hydraulic system to adjust the hydraulic cylinder of only the secondary set to the cylinder length target calculated for the secondary set, independent of the primary set.

2. The agricultural implement of claim 1, further comprising a hydraulic cylinder arranged with respect to the frame for changing an angle of the frame with respect to the ground, wherein upon receiving from the operator controls a change for a ground engaging depth for the primary set, the controller further executes to calculate a cylinder length target for the hydraulic cylinder arranged with respect to the frame and control the hydraulic system to adjust the hydraulic cylinder arranged with respect to the frame to the cylinder length target.

3. The agricultural implement of claim 2, wherein the operator controls further configure the angle of the frame with respect to the ground.

4. The agricultural implement of claim 1, wherein the primary set comprises tillage shanks for ripping compacted soil.

5. The agricultural implement of claim 4, wherein the secondary set comprises disc blades for cutting agricultural residue, and wherein the disc blades are arranged forward of the tillage shanks.

6. The agricultural implement of claim 5, further comprising a secondary set comprising leveling discs for distributing soil, wherein the leveling discs are arranged rearward of the tillage shanks.

7. The agricultural implement of claim 6, further comprising baskets for breaking soil clods, wherein the baskets are arranged rearward of the leveling discs.

8. The agricultural implement of claim 1, wherein a maximum ground engaging depth for the primary set is greater than a maximum ground engaging depth for any secondary set.

9. The agricultural implement of claim 8, wherein the maximum ground engaging depth for the primary set is at least 14 inches.

10. The agricultural implement of claim 1, wherein each hydraulic cylinder includes a sensor for providing feedback with respect to cylinder length, and wherein the controller executes a closed loop control system with the feedback to adjust each hydraulic cylinder to a cylinder length within a tolerance band of the cylinder length target.

11. A method for changing ground engaging depths for tools of an agricultural implement, the agricultural implement comprising a frame supported by a plurality of wheels, a plurality of ground engaging tools supported by the frame, the plurality of ground engaging tools including a primary set and at least one secondary set, wherein each set includes a hydraulic cylinder arranged with respect to the frame for raising and lowering the set, and wherein each set is configured to engage the ground at a ground engaging depth when lowered to be in contact with the ground, and a hydraulic system comprising a pump configured to supply hydraulic fluid and a plurality of electronically controlled valves, wherein each electronically controlled valve is configured to meter hydraulic fluid with respect to a hydraulic cylinder, the method comprising:

configuring a ground engaging depth for each set;

upon receiving a change for a ground engaging depth for the primary set, calculating a cylinder length target for a hydraulic cylinder of the primary set and for each secondary set for achieving the ground engaging depth for each set, and controlling the hydraulic system to adjust the hydraulic cylinder of the primary set and for each secondary set to the cylinder length target calculated for the primary set and for each secondary set; and upon receiving a change for a ground engaging depth for a secondary set, calculating a cylinder length target for a hydraulic cylinder of only the secondary set for achieving the ground engaging depth for the set, and controlling the hydraulic system to adjust the hydraulic cylinder of only the secondary set to the cylinder length target calculated for the secondary set, independent of the primary set.

12. The method of claim 11, further comprising upon receiving a change for a ground engaging depth for the primary set, calculating a cylinder length target for a hydraulic cylinder arranged with respect to the frame for changing an angle of the frame with respect to the ground, and controlling the hydraulic system to adjust the hydraulic cylinder arranged with respect to the frame to the cylinder length target.

13. The method of claim 12, further comprising configuring the angle of the frame with respect to the ground.

14. The method of claim 11, wherein controlling the hydraulic system to adjust the hydraulic cylinder of each set to the cylinder length target calculated for the set is executed in a closed loop control system with feedback from a sensor provided with respect to each hydraulic cylinder.

15. The method of claim 11, wherein controlling the hydraulic system to adjust the hydraulic cylinder of only the secondary set to the cylinder length target calculated for the set is executed in a closed loop control system with feedback from a sensor provided with respect to each hydraulic cylinder;

to operatively engage the alignment system for aligning the skid on the frame.

\* \* \* \* \*